United States Patent [19]

Schwab

[11] Patent Number: 5,528,244
[45] Date of Patent: Jun. 18, 1996

[54] PROCESSING FOR MODE S SIGNALS SUFFERING MULTIPATH DISTORTION

[75] Inventor: Carl E. Schwab, Huntington Station, N.Y.

[73] Assignee: Cardion, Inc., Woodbury, N.Y.

[21] Appl. No.: 414,675

[22] Filed: Mar. 31, 1995

[51] Int. Cl.⁶ .................................................. G01S 13/93
[52] U.S. Cl. .................. 342/37; 342/30; 342/32; 342/39
[58] Field of Search .................. 342/29, 30, 32, 342/36, 37, 39, 40, 46, 50

[56] References Cited

U.S. PATENT DOCUMENTS

| | | | |
|---|---|---|---|
| 4,688,046 | 8/1987 | Schwab | 342/456 |
| 4,870,425 | 9/1989 | Gunny | 342/455 |
| 5,077,673 | 12/1991 | Brodegard et al. | 364/461 |
| 5,089,822 | 2/1992 | Abaunza et al. | 342/30 |
| 5,107,268 | 4/1992 | Sturm et al. | 342/36 |
| 5,122,804 | 6/1992 | Shulenberger | 342/37 |
| 5,144,315 | 9/1992 | Schwab | 342/49 |
| 5,157,615 | 10/1992 | Brodegard et al. | 364/461 |
| 5,182,563 | 1/1993 | Blinchikoff et al. | 342/32 |
| 5,196,855 | 3/1993 | Kuroda | 342/37 |
| 5,208,591 | 5/1993 | Ybarra et al. | 340/961 |
| 5,400,031 | 3/1995 | Fitts | 342/36 |
| 5,448,243 | 9/1995 | Bethke et al. | 342/59 |

OTHER PUBLICATIONS

Article entitled "Propogation of Mode-S Beacon Signals on the Airport Surface," by M. L. Wood, 1989 pp. 397–410.
Sales brochure of Cardion, Inc., entitled "CAPTS Cooperative Area Precision Tracking System," 1993.
USDOT/FAA Specification, "Mode-S Beacon System (Mode S) Sensor, FAA–E–2716 & Amendment 2", Mar. 24, 1983 pp. 121–125 & 139–154.

*Primary Examiner*—John B. Sotomayor
*Attorney, Agent, or Firm*—Lawrence C. Edelman

[57] ABSTRACT

A communication system for receiving aircraft reply squits (transmissions) normally used in a radar beacon system for surveilling aircraft in a given geographic area. The communication system includes a plurality of omnidirectional receivers, each receiver having a function of omnidirectionally receiving the aircraft squits and developing therefrom two types of information strings, namely a data string, indicative of a message in the aircraft squit, and a corresponding confidence string indicative of the reliability of the developed data string. A data communication link transmits the data and confidence strings between the plurality of omnidirectional receivers and the master data processor. The master data processor processes the data strings and corresponding confidence strings developed by each of the plurality of omnidirectional receivers by performing a bit-by-bit comparison of the received data strings and corresponding confidence strings, so as to develop by the comparison a corrected data string which minimizes the use of data bits from the data strings received over the data communication link that are indicated by the corresponding confidence strings as having a low reliability.

19 Claims, 4 Drawing Sheets

501 ╲ TRANSMITTED DATA STRING
   ╲─ 1100 00101010101100110011001100000111101010011001010100011101

502 ╲ RX#1 DATA STRING
   ╲─ 1100 001#1#1#1#11#011#01##011#00001111#1#1#011#0##1#1#00#11#1
503 ╲ RX#1 "CONFIDENCE STRING"
   ╲─ 1111 111010101011011101100111011111111010101110100101011011 01

504 ╲ RX#2 DATA STRING
   ╲─ 1100 00#010##1011#0##001#00110##001111##010011#01#10100#1#101
505 ╲ RX#2 "CONFIDENCE STRING"
   ╲─ 1111 110111001111010011101111100111111001111110110111110 10111

506 ╲ RX#3 DATA STRING
   ╲─ 1100 #0101#1010##001##01100#10000#1#110##100110#10101#0011#01
507 ╲ RX#3 "CONFIDENCE STRING"
   ╲─ 1111 011110111100111001111101111101011100111111011111101111011

508 ╲ RX#4 DATA STRING
   ╲─ 1100 00101#10#0110#11#011#011#000#11110#0100#1#010101#0011#01
509 ╲ RX#4 "CONFIDENCE STRING"
   ╲─ 1111 111110110111101101110111011101111101111010111111101111011

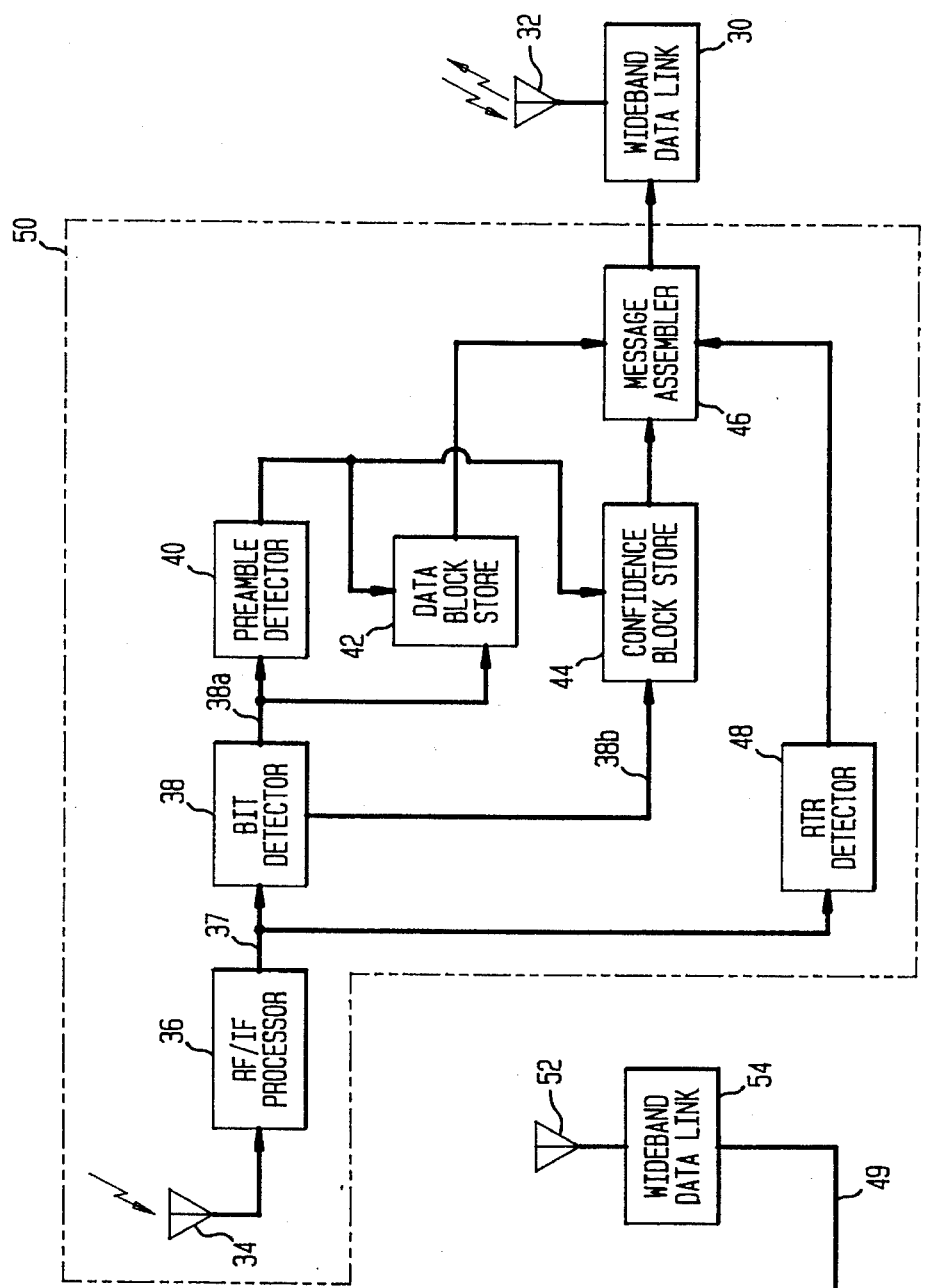

DATA STRINGS 1100 001#1#1#1#11#011#01##011#00001111#1#1#011#0##1#1#00#11#1
1100 00#010##1011#0##001#00110##001111##010011#01#10100#1#101
1100 #0101#1010##001##01100#10000#1#110##100110#10101#0011#01
1100 00101#10#0110#11#011#011#000#11110#0100#1#010101#0011#01

604

CONFIDENCE STRINGS 1111 1110101010110111011001110111111110101011101001010101101101
1111 1101110011110100111011111100111111001111110110111111010111
1111 0111101111001110011111011111010111001111110111111011111011
1111 1111101101111011011101110111011111101111010111111101111011

605

CORRECTED DATA STRING 1100 001010101011001100110011000001111010100110010101000111101

606

RANDOMLY GENERATED "CONFIDENCE" STRINGS 1111 1110101000001100110010100011110001110010101111001111010
1111 1011001010011101111111001011111001100011100100110101111
1111 1100100000110000111101101010110011010110111000000001010
1111 1011101100001001110111010001100111010110000100111101100

608

"CONFIDENCE" CORRECTED DATA STRING 1100 00101#101#1100#1001100110#0001111010100110010101000111101

PROCESSING FOR MODE S SIGNALS SUFFERING MULTIPATH DISTORTION

BACKGROUND OF THE INVENTION

1. Field of the Invention

The present invention relates generally to Air Traffic Control (ATC) systems, and more particularly, to improvements in the air/ground data communication link provided by a Mode-S Secondary Surveillance Radar (SSR) beacon system.

2. Description of the Prior Art

Current radars for surveilling airborne aircraft evolved from designs developed for military use during World War II. The ATC Radar Beacon System (ATCRBS) is a secondary, or beacon radar that grew out of the Identification Friend or Foe (IFF) military system. ATCRBS is a cooperative radar in that it does not rely on the receipt of reflected energy from aircraft. Instead, the aircraft carries a transponder, i.e., a receiver/transmitter. The transponder recognizes interrogations from a ground based radar and transmits a reply. This capability greater increases the surveillance range of the radar and enables an aircraft identification function (called a Mode-A reply) wherein the transponder attaches an identification code to its reply. In addition to the identification function, many aircraft connect their altimeters to the transponders so that their replies can include altitude information (called a Mode-C reply). In both Mode-A and Mode-C systems, when transmitting information, an SSR sequentially transmits interrogation signals to aircraft in the area for requesting information from the aircraft. The interrogation signal transmitted by the SSR contains three pulses, with the first and third pulse being separated by a pre-determined width and transmitted at a specific frequency. The second pulse is a side-lobe suppression signal transmitted from an omnidirectional antenna co-located with a mechanically rotating antenna which provides a highly directive antenna beam in a horizontal plane. The time interval between first and third pulses defines what information the interrogator is requesting i.e., eight (8) microseconds for identification and twenty-one (21) microseconds for altitude. Upon receipt of the interrogation signal, the aircraft transponder develops a reply signal to supply to the transponder the requested information consisting of identification and/or altitude. The SSR processes the received signal, together with time of arrival range information, to develop a measurement of position for each responding aircraft. The Mode-C and Mode-A systems are unable to relay additional information or messages between the SSR and the interrogated aircraft, other than the forenoted identification and altitude information.

During the 1960's, ATCRBS began to overload because of increases in the number of aircraft, the percentage of aircraft that were equipped with transponders, and the number of ATCRBS radar installations. Due to this overload, the Mode-C and Mode-A systems developed significant amounts of interference and garble because many aircraft transponders within the main beam of the interrogating SSR would give a reply.

In recognition of this and other deficiencies in ATCRBS, the Mode Select (Mode-S) system was developed to allow the active transmission of messages or additional information by the SSR, as well as the incorporation of various techniques for substantially reducing transmission interference. The Mode-S sensor includes all the essential features of ATCRBS, and in addition includes individually timed and addressed interrogations to Mode-S transponders carried by the aircraft. Additionally, the rotating directive antenna system is of monopulse design. Thus, the Mode-S sensor will allow full surveillance in an integrated ATCRBS/Mode-S environment.

The Mode-S sensor produces an identity tag for aircraft in the surveillance area by message transmission using one of two techniques, thereby enabling subsequent discreet addressing of the aircraft. One technique is a Mode-S SQUITTER performed by the Mode-S transponder (in the aircraft) the other technique is a Mode-S ALL CALL, performed by the sensor (on the ground). During a Mode-S SQUITTER, the Mode-S transponder spontaneously and pseudo-randomly transmits (squits) once per second, on its own, a specific address code, unique to the aircraft carrying the transponder. During a Mode-S ALL CALL, the Mode-S sensor transmits an ATCRBS- like spatial identity interrogation signal which elicits a transponder reply transmission of discrete identification.

As noted above, the Mode-S transmissions have two different message lengths, one has 32 bits of data and the other has 88 bits of data. Additionally, each message includes 24 bits of Cyclic Redundant Cycle (CRC) error checking code bits, making the message lengths 56 bits and 112 bits in length, respectively.

Unfortunately, the format selected for Mode-S downlink transmissions is susceptible to multipath effects that produce delays in the order of 500 to 1,000 nanoseconds and oftentimes result in the delayed reflected signals being received with amplitudes comparable with those received by a direct path. However, in view of the fact that the Mode-S system includes a highly directive rotating antenna, the designers of the Mode-S system concluded that in the majority of cases, the reflected-path signal would either be much weaker or sufficiently delayed so as to be easily separable in the time domain from the direct-path signal. These designers visualized that the most prevalent interference problem would be the collision in time of a Mode-S reply with an ATCRBS signal. These signals are on the same frequency (1090 mHz) and transmitted at the same relative signal level. The technical solution provided by the designers was to include a cyclic redundancy check (CRC) parity word with each message transmitted. A 24 bit CRC was chosen, and can correct all error patterns not exceeding 24 bits in length. This works well to prevent ATCRBS interference because the ATCRBS message is less than24 microseconds in duration, and therefore corresponds to less than24 bits of the Mode-S reply length.

Described in much greater detail in the publication titled, MODE SELECT BEACON SYSTEM (MODE-S) SENSOR, available from the U.S. Department of Transportation, Federal Aviation Administration, Specification Number FAA-E-2716 amendment-2 dated Mar. 24, 1983, the Mode-S receiver includes a message processor which generates a "confidence string" to represent the quality of the received signal. In this case, quality means the cleanness of the bit-by-bit decisions provided by the message processor. The nature of the Mode-S transmitted message is that each data bit is one microsecond in length. A "one" is represented by a ½ microsecond pulse followed by a ½ microsecond space. A "zero" is represented by a ½ microsecond space followed by a ½ microsecond pulse. A confidence count of "1" indicates high quality and is generated when the ½ microsecond pulse amplitude is within a specific amplitude range relative to the preamble portion of the transmitted message, and the ½ microsecond space has no energy greater than a reference value of the pulse amplitude reference. The confidence count for each bit of the message is grouped together in a serial fashion with the confidence count for all the other bits of the message, to develop a "confidence count string." This confidence count string is further processed to determined that "0's" in the confidence string span no more that 24 consecutive data bit positions. If the "0's" span no more than 24 microseconds (24 consecutive data bit positions), the overall message is given a high "confidence count" or 1. If the "0's" span more than 24 microseconds, no attempt is made to decode/correct the message, and the message data is discarded.

An additional problem with the communication link provided by the Mode-S system is that there is increasing desire on the part of aircraft owners to have additional message capability between the aircraft and the ground. Typically, this additional information would include AOC (Aircraft Operational Command) information comprising two to three pages of text with flight arrival information, such as gates, passenger lists, meals on board, etc., as well as Flight Critical Data (FCD). Due to the nature of the Mode-S rotating antenna, the communication link is periodically broken, for example at four (4) second intervals, i.e., fifteen times per minute. Such periodic breaks in the communication link are extremely undesirable.

one solution to providing an improved Mode-S communication link is disclosed, for example, in U.S. Pat. No. 5,196,855 which discloses the use of an electronic scanning (E-scan) type of antenna in addition to the conventional highly directive rotating mechanical antenna, for increasing the data link communications capacity of the Mode-S sensor. A major disadvantage of this system is the expense and system complexity of the electronic scanning antenna and its support apparatus.

Another solution which would improve the communication link in a Mode-S system is to include an omnidirectional antenna for receiving the Mode-S transmissions such as described in an article titled "Propagation of Mode S Beacon Signals on the Airport Surface" published in *The Lincoln Laboratory Journal*, Volume 2, Number 3 (1989) pages 397–410. The use of omnidirectional antennas provides the advantage of lower costs as compared to an electronic scanning antenna and, if multiple omnidirectional antennas are used to provide multiple received sites, multilateration techniques can be used as a confirmation or "sanity" check of the aircraft position as determined by the conventional Mode-S processing, retransmitted GPS data, or other means.

Unfortunately, in a Mode-S downlink using an omnidirectional antenna, the transmissions are susceptible to multipath effects. As previously noted, conventional Mode-S receivers include a highly directional antenna having a sharply tapered lower edge of the receive beam. This tends to sharply reduce the amplitude of received reflected signals.

In an environment using multiple omnidirectional antennas for receiving the Mode-S transmission, as previously mentioned, there can be a significant amount of multipath effects where multiple signals are received with 500 to 1,000 nanosecond delay. Depending upon the consecutive bit pattern in the message, there is a strong likelihood that pulses will collide, due to the multipath, into the ½ microsecond spaces of the Mode-S message. This phenomena is code content dependent, as well as site dependent. In any event, the result of pulse collisions is that an error pattern will tend to distribute "0's" in the confidence string throughout the data message, with a span which will generally be greater than the 24 microsecond span that the CRC error correcting code is designed to handle.

It is an object of the present invention to provide an improved communication link for use with the Mode- S, or similar, System.

It is a further object of the invention to provide an SSR sensor which can provide not only high precision surveillance function, but also a high speed and large capacity air/ground datalink communications function.

It is a still further object of the invention to provide such improved data handling capacity at a relatively low cost, and furthermore in a manner which provides the ability to validate the Mode-S position information.

SUMMARY OF THE INVENTION

In accordance with the present invention, multiple omnidirectional receiver sites are provided for receiving aircraft transmissions having message data. Each omnidirectional receiver does not attempt to apply CRC processing to the transmissions, as is conventional in, i.e., Mode-S receivers, and instead the CRC processing is performed, if needed, at a master site after the multiple receive sites perform only initial processing of the aircraft transmissions. The initial processing of the message data component of the transmissions comprises developing the "confidence string" as is conventional for an aircraft transmission. However, in the new system, each receiver site will transmit to a master site along with the message data, a confidence string. At the master site the confidence string for a given message is compared with the confidence strings received from each of the other receive sites for the same message. Because of the different multipath delays at each receive site, for each bit of the message which may be corrupted due to multipath effects, as evidenced by a "0's" in its corresponding confidence string, a "1" will most probably be provided in the confidence string for. that bit in the message bit received from a different one of the receive sites. Proceeding in this manner to make a bit-by-bit comparison of the confidence strings, the master site can generate a high quality (i.e., high confidence) recovered message output by using as many as possible of those message bits provided by receive sites where the corresponding bit in the confidence string was high (a "1").

These and other objects of the invention will became apparent from the following detailed description of a preferred embodiment of the invention, the accompanying drawings, and the claims.

BRIEF DESCRIPTION OF THE DRAWINGS

FIG. 3 illustrates a block diagram of one ground receive station of the system illustrated in FIG. 1, for providing Mode-S communication with aircraft in accordance with the present invention;

FIG. 4 illustrates a block diagram of the master ground receive station of the system illustrated in FIG. 1, for providing Mode-S communication with aircraft in accordance with the present invention;

FIG. 6 illustrates the generation of a corrected Mode-S data string at the master site in accordance with the principles of the present invention.

DETAILED DESCRIPTION OF THE PREFERRED EMBODIMENT

Figures 1, 5:
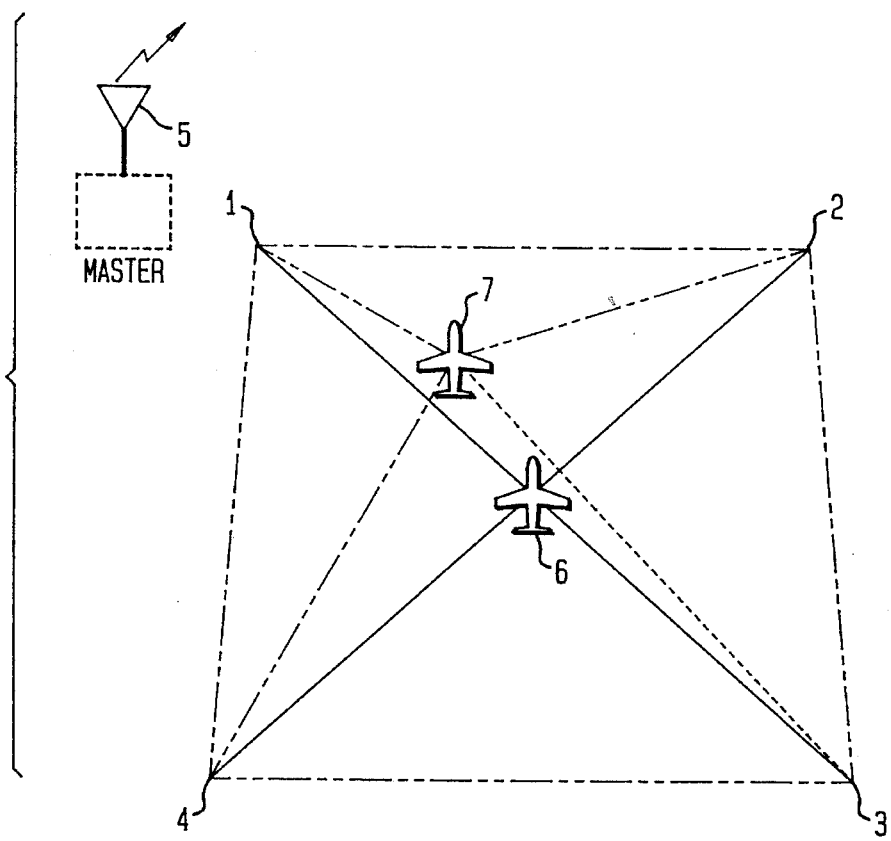
FIG. 1 illustrates a communication system disposed over a given geographic area and constructed in accordance with the principles of the present invention and embodied in a Mode-S System.
FIG. 5 illustrates data strings and confidence strings which are provided by multiple receive sites to a master site, in accordance with the principles of the present invention.

FIG. 1 shows an aircraft surveillance area whose boundaries form a quadrilateral, the corners of the quadrilateral include ground receive stations 1, 2, 3 and 4, respectively, as well as two aircraft 6 and 7. Ground receive station 1 is a master ground receive station which collects data from the other ground receive stations by, for example, a two-way communications link. It is noted that the surveillance area need not be a quadrilateral, and in fact many other shapes may be appropriate. Furthermore, although in the illustrated embodiment ground receive station 1 is a master ground receive station, the functionality of the master station could be carried out at a separate data processing location (i.e., at the control tower) instead of at one of the receive sites.

As previously noted, in the Mode-S system, aircraft 6 and 7 carry equipment such as, for example, a conventional Mode-S transponder, that spontaneously transmits, i.e., squits, Mode-S transmissions. The transmitted signals comprise aircraft altitude and identification information components, as well as a message component.

Figure 2:
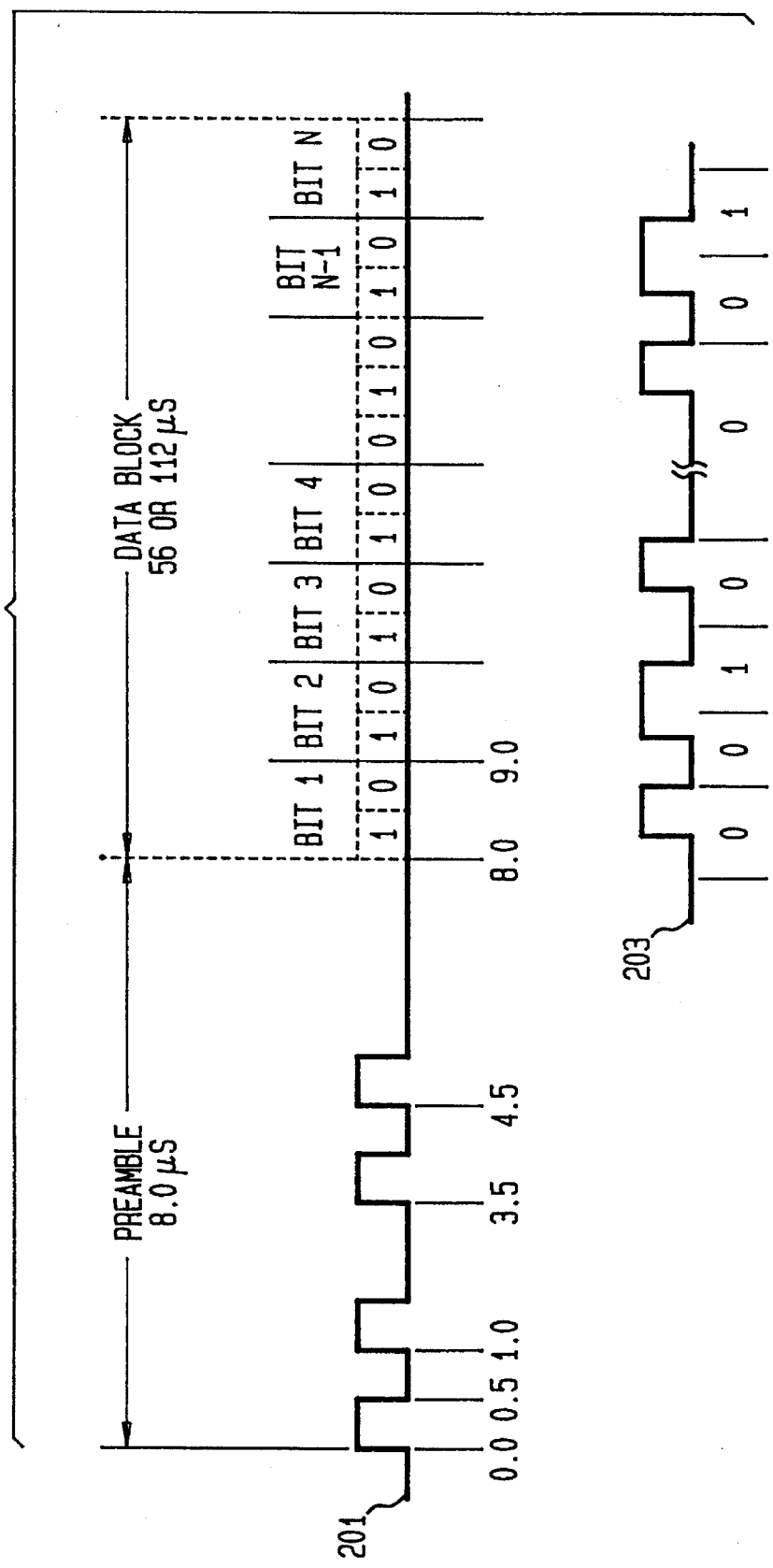
FIG. 2 illustrates on exemplary Mode-S reply.

FIG. 2 illustrates an exemplary Mode-S transmission 201. The reply is comprised of:

1. A Mode-S preamble 201, consisting of two 1's (each comprised of a one-half microsecond High (H) followed by a one-half microsecond Low (L)), followed by a one microsecond space, and then two 0's (each comprised of a one-half microsecond L, followed by a one-half microsecond H), followed by three one microsecond spaces, and 2. A data (message) block 203. As stated earlier, the data block (data plus CRC) can be either 56 or 112 microseconds in length.

The exemplary transmission shown in FIG. 2 includes a data string shown as 0010 . . . 001.

Reference is now made to FIG. 3, which illustrates a block diagram of one of ground receive stations 2–4 of the system illustrated in FIG. 1, for providing Mode-S communication with aircraft in accordance with the present invention. In conjunction therewith, reference should also be made to FIG. 5, which shows the signals generated by the ground receive stations. As shown in FIG. 3, each ground receive station includes a wideband data link transmit/receive station 30 connected to a microwave antenna 32 which is positioned to communicate with master ground receive station 1. The wideband data link enables synchronization of the ground receive station processing with the real time reference (RTR) master clock at the master ground receive station 1. Additionally, the recovered Mode-S reply message data and, if desired, (although not specifically shown) time of arrival information (as well as the Mode-S identity and altitude information) is transmitted to the master ground receive station 1 over the wideband data link 30.

Although the wideband datalink 30 is shown to be a wideband microwave data link, those of ordinary skill in the art understand that the present invention is not limited to such an embodiment and that, in accordance with the present invention, the wideband data link could also be embodied as a fiber distributed data interface, a token data highway embodied on telephone lines, and so forth.

Transmitted signals emitted by aircraft 6 and 7 are received by an omnidirectional antenna 34 at the conventional IFF reply frequency of 1090 mHz. The received RF signals are processed by an RF/IF processor 36 which includes bandpass filters for selecting the 1090 mHz signal, preamplifiers, and a mixer/IF stage for providing at an output 37, a detected analogue video signal. Appropriate circuitry for RF/IF processor 36 is well known to those of ordinary skill in the art and is described, for example, in the forenoted FAA specification entitled MODE SELECT BEACON SYSTEM (MODE-S) SENSOR at pages 122–124.

Referring to transmitted data string 201, note it includes a preamble portion followed by 56 bits of data. Each 0 or 1 data bit occupies one microsecond, with a falling edge at the midpoint representing a 1, and a rising edge at the midpoint representing a 0. Accordingly, a bit detector 38 digitize the analog video stream at output 37 (using well known comparator techniques) for providing a 1, or H, output at rising one-half amplitude levels and a 0, or L, at falling one-half amplitude levels.

Bit detector 38 also makes two determinations:
1. Was the transition "on-to-off" or "off-to-on" and during the "on" was it within a specified amplitude range of the "on" values seen in the preamble?
2. Was the "off" condition at least a specified number of decibels less than the "on" condition?

Bit detector 38 outputs on line 38a the digitized message data string, and on line 38b the corresponding confidence string. The confidence string will be all 1's for a clean signal, i.e., no multipath caused distortion or data collision. In the exemplary confidence string 503 (FIG. 5) for receiver #1, the 0's in the confidence string are the result of the "on" condition failing the amplitude window or the "off" condition failing to be sufficiently below the amplitude of the "on" condition. A # symbol is inserted into data string 502 whenever the confidence bit for that position is 0. It should be noted that the bit detector 38 does generate a 1 or 0 at these time slots, however they cannot be trusted, i.e., they have a low confidence count. Bit detector 38 is easily constructed by those of ordinary skill in the art using the functionality described above, and one embodiment is described, for example, in the forenoted FAA specification entitled MODE SELECT BEACON SYSTEM (MODE-S) SENSOR at pages 122–124.

A preamble detector 40 detects the preamble bit pattern of a received transmission, which never changes. The output of preamble detector 40 provides a timing signal $t_s$, which enables the storage of signals provided by bit detector 38 in a data block store 42 and a confidence block store 44. Data block store 42 has an input responsive to the digitized data output 38a of bit detector 38 and thereby provides at its output data strings for the transmission messages (data strings 502–508 of FIG. 5).

Confidence block store 44 is responsive to the preamble timing signal $t_s$, and output 38b of bit detector 38 which indicates the confidence of the detected bit in the transmitted message, e.g., a 1 for high confidence and a 0 for low confidence. Thus, the output of confidence block store 44 comprises confidence strings 503–509 of FIG. 5). A message assembler 46 receives the data strings, confidence strings, and a 16 bit word indicating the real time reference (RTR value) of the local clock generated by an RTR offset detector 48 at the receive station, and transmits the assembled message to the master site via wideband data link 30. In addition to RF/IF processor 36, although not shown, conventional Mode-S identity and altitude data transmitted as part of the Mode-S reply can also be decoded at the receive site in accordance with the Mode-S system and provided as an input to the message assembler for transmission to the master site.

FIG. 5 shows the transmitted data string, renumbered as 501, and the received data strings 502, 504, 506 and 508, developed at each of receive sites 1–4, respectively, and each of the confidence strings 503, 505, 507 and 509 developed at each of the receive sites 1–4 and also transmitted to the master site. At the master site the confidence strings, 503–509 are stored and compared with one another on a sequential bit-by-bit basis by a central processing unit (CPU). Since each of the receive sites is situated at a different geography, its received signals will have a different delay and amplitude due to the multipath effects. As a consequence, the master site CPU can process the confidence strings 503–509 on a comparative, bit-by-bit sequential basis, to incrementally take advantage of the received signal having the best quality, as evidence by its confidence count, to determine on a bit-by-bit basis which is the most accurate version of each portion of the data strings.

In a similar manner to that shown in FIG. 3, the bit detectors at the other receive sites generate data strings 504–508 and confidence strings 505–509. Because the geometry of the RF path from the transmitter to each of the receive sites is different, the confidence string 0's generally will not align at the same data bit position at all four stations at the same time. This effect of non-aligned data distortion is taken advantage of in the present invention, for developing a corrected data string.

FIG. 4 illustrates a block diagram of the master ground receive station 1 of the system illustrated in FIG. 1, for providing Mode-S communication with aircraft in accordance with the present invention.

As shown in FIG. 4, the master receive station 1 includes an omnidirectional Mode-S receiver 50 constructed substantially in accordance with the omnidirectional receiver 50 shown in FIG. 3, and therefor its description will not be repeated. Additionally, the master receive station 1 includes a microwave antenna 52 coupled to a wideband data link 54 for transmitting RTR timing reference signals to the other receive stations and for receiving from the other receive stations the assembled messages having the timing, data block and confidential block information. A master RTR clock 56 at master receive station 1 provides an RTR clock signal to the omnidirectional receiving portion 50, as well as to CPU (Central Processing Unit) 58. CPU 58 receives the data strings and confidence strings from the omnidirectional receiver 50 via input line 47, and at input line 49 receives the data strings and corresponding confidence strings from the other receive sites, i.e., 2–4, transmitted via wideband data link 54.

FIG. 6 illustrates a grouping 602 of the data strings from receive sites 1, 2, 3 and 4 set in row form, so that each sequential data bit appears as an aligned column. Inspection of these rows and columns reveals that every data bit was received clearly by at least one of receive stations 1–4. Next, a grouping 604 of the confidence strings are similarly illustrated by rows and columns to show the confidence information.

Inspection of the grouped data strings in FIG. 6 illustrates that 60 of the data bits were sufficiently interfered with so that the confidence bit was a zero, i.e., 27 percent of the data bits were corrupted, and yet, a corrected data string 605 (accurately corresponding with the transmitted data string 501) could easily be developed without even invoking CRC processing. CPU 58 performs this grouping and inspection, and develops there from corrected data strings 605.

In the present example the multipath effects were simulated by assuming a direct path which is approximately equal to the reflected path. The delay in each of the receive sites was varied over the range of 500 to 1,000 nanoseconds. Because of this variation, the zeros in the confidence strings, in general, do not always overlap. This is a realistic, nearly worst case scenario.

In FIG. 6, a confidence string data block 606 is illustrative of a scenario which is "worse than worst". This scenario was developed by simply letting a random generator set the value of the confidence bits. In this example 50 percent of the confidence bits are zero. The same data strings 602 were assumed, and a corrected data string 608 results. Data string 608 indicates that even with 50 percent of the confidence bits being zero, only four corrupted bits remain in the corrected data string. Since these four corrupted bits span less than 24 microseconds, CRC processing can correct the data string to provide perfect decoding of the Mode-S message data.

An advantage of the present invention is that although data loading on the communication link between the receive sites and the master site is increased, the hardware at the receive sites is significantly less complex than in prior systems since message correction and decoding is not performed at each of the receive sites. Hence, the present invention provides for less costly hardware configurations at the receive sites and handles the problem of multipath and data collisions much better than prior art systems. Additionally, the present system would allow substantially the same received site hardware to be used in the event that other formats different from Mode-S or ATCRBS are eventually adopted, while providing high quality corrected message handling.

Thus, there has been shown and described a novel Mode-S communication system which satisfies all the objects and advantages sought therefore. Many changes, modifications, variations and other uses and applications of the subject invention will, however, become apparent to those skilled in the art after considering this specification and its accompanying drawings, which disclose preferred embodiments thereof. For example, although four receive sites are described, it is clear that in a minimum system, as few as two different receive sites are required. Furthermore, although the master site is also a receive site, the master site signal processing could be performed at a separate location. Additionally, with only slight modification, the omnidirectional receivers could calculate the aircraft position using well known multilateration techniques, to be used as a comparative or "sanity" check against the. Mode-S position information or GPS position. Even furthermore, although only receive communication has been discussed above, it is clear that the omnidirectional communication system of the invention could easily be modified to also include an uplink transmitter for sending communications to the aircraft via the Mode-S uplink frequency, e.g., at 1030 mHz. For example, as shown by dashed lines in FIG. 1, one or more of the receive sites could also include an omnidirectional transmitter, 5 at master site 1, for transmitting differential GPS (position correction) information, and/or AOD (Aircraft Operational Command) and ATC (Aircraft Operational Command) and ATC (Aircraft Traffic Control) information to the identified aircraft. Such uplink transmitted information could also include graphics maps with ground based weather information. In the event that plural transmitters are included in the system, only one transmitter need be active at a time, with selection of that transmitter advantageously being selected based upon analysis/comparison of the recently received signals to find the transmitter having the best location for that particular aircraft. All such changes, modifications, variations and other uses and applications which do not depart from the spirit and scope of the invention are deemed to be covered by the invention which is limited only by the claims which follow.

I claim:

1. A communication system for receiving aircraft reply squits (transmissions) normally used in a surveillance radar system for surveilling aircraft in a given geographic area, comprising:

a plurality of omnidirectional receivers, each receiver having a function of omnidirectionally receiving said aircraft squits and developing therefrom two types of information strings, namely a data string, indicative of a message in said aircraft squit, and a corresponding confidence string indicating the reliability of the developed data string;

a master data processor; and a data communication link for transmitting data between said plurality of omnidirectional receivers and said master data processor, said master data processor receiving, via said data communication link, the data strings and corresponding confidence strings developed by each of said plurality of omnidirectional receivers for performing a bit-by-bit comparison of the received data strings and corresponding confidence strings, so as to develop by said comparison a corrected data string which minimizes the use of data bits from the data strings received over the data communication link that are indicated by the corresponding confidence strings as having a low reliability.

2. The communication system of claim 1, wherein said plurality of omnidirectional receivers comprise at least two omnidirectional receivers, and the master data processor is located at one of said omnidirectional receivers.

3. The communication system of claim 2, wherein said omnidirectional receivers each include:

an RF/IF receiver for receiving said aircraft reply squits and developing therefrom and analogue video signal;

a bit detector responsive to said analogue video signal for providing at a first output a data bit stream and at a second output corresponding confidence bit stream indicating on a bit-by-bit basis the reliability of each bit of the data bit stream;

a preamble detector responsive to said data bit stream for generating a timing signal upon detection of the start of a data message in the received squit;

a data block store responsive to said data bit stream and said timing signal for developing said data strings;

a confidence block store responsive to said confidence bit stream and said timing signal for developing said confidence strings; and a message assembler responsive to said data strings and said confidence strings for providing to said communication link a data message including said data strings and said confidence strings for transmission to said master data processor.

4. The communication system of claim 3, wherein said master data processor includes:

a central processing unit for performing a bit-by bit comparison of the confidence strings received via said communication link from each of said omnidirectional receivers, in an attempt to identify a bit position in at least one of said received data strings which has a high confidence value, for each bit position of said received data strings, and developing a corrected received data string which minimizes the use of those bit positions of said received data strings which have a low confidence value.

5. The communication system of claim 1, wherein said a data communication link comprises a bi-directional data communication link for bi-directionally transmitting data between said plurality of omnidirectional receivers and said master data processor.

6. The communication system of claim 5, wherein said a data communication link comprises a bi-directional wireless Radio Frequency data communication link.

7. The communication system of claim 5, wherein said a data communication link comprises a bi-directional wired data communication link.

8. The communication system of claim 4, wherein:

said message assembler also provides to said communication link a timing signal representative of the time-of-arrival of the data message corresponding to given ones of said data strings and corresponding confidence strings; and said central processing unit is responsive to said timing signals for using multilateration processing to develop position information for the aircraft which transmitted the corresponding reply squit.

9. The communication system of claim 1, wherein said aircraft transmissions comprise spontaneous, pseudo-random transmissions.

10. The communication system of claim 1, wherein said aircraft transmissions comprise replies to ground-based interrogations.

11. The communication system of claim 9, wherein said aircraft transmissions comprise Mode-S transmissions.

12. The communication system of claim 10, wherein said aircraft transmissions comprise Mode-S transmissions.

13. The communication system of claim 1, further including at least one omnidirectional transmitter for transmitting information to said aircraft.

14. An aircraft communication system, comprising:

a plurality of omnidirectional receivers, each receiver having a function of omnidirectionally receiving aircraft transmissions and developing therefrom two types of information strings, namely a data string, indicative of a message in said aircraft transmission, and a corresponding confidence string indicating the reliability of the developed data string;

a master data processor; and a data communication link for transmitting data between said plurality of omnidirectional receivers and said master data processor, said master data processor receiving, via said data communication link, the data strings and corresponding confidence strings developed by each of said plurality of omnidirectional receivers and said master data processor, said master data processor receiving, via said data communication link, the data strings and corresponding confidence strings developed by each of said plurality of omnidirectional receivers for performing a bit-by-bit comparison of the received data strings and corresponding confidence strings, so as to develop by said comparison a corrected data string which minimizes the use of data bits from the data strings received over the data communication link that are indicated by the corresponding confidence strings as having a low reliability.

15. The communication system of claim 14, further including at least one omnidirectional transmitter for transmitting information to said aircraft.

16. The communication system of claim 14, wherein said aircraft transmissions comprise spontaneous, pseudo-random transmissions.

17. The communication system of claim 14, wherein said aircraft transmissions comprise replies to ground-based interrogations.

18. The communication system of claim 16, wherein said aircraft transmissions comprise Mode-S transmissions.

19. The communication system of claim 16, wherein said aircraft transmissions comprise Mode-S transmissions.

* * * * *